US008992057B2

(12) United States Patent
Foley et al.

(10) Patent No.: US 8,992,057 B2
(45) Date of Patent: Mar. 31, 2015

(54) EXPRESSIVE VEHICLE LIGHTING ASSEMBLY

(71) Applicant: GM Global Technology Operations LLC, Detroit, MI (US)

(72) Inventors: Kenneth J. Foley, Sterling Heights, MI (US); Randal G. Maes, Harrison Township, MI (US); Matthew J Michal, Royal Oak, MI (US); Kenneth V. Hollewa, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 13/794,933

(22) Filed: Mar. 12, 2013

(65) Prior Publication Data

US 2014/0268852 A1 Sep. 18, 2014

(51) Int. Cl.
*F21S 8/10* (2006.01)

(52) U.S. Cl.
CPC ............ *F21S 48/00* (2013.01); *F21S 48/1225* (2013.01); *F21S 48/2212* (2013.01)
USPC .......................................... 362/464; 362/520

(58) Field of Classification Search
CPC ...... B60Q 1/26; B60Q 1/2611; B60Q 1/2696; B60Q 1/44; B60Q 1/444; B60Q 1/447; B60Q 1/46; B60Q 1/503; B60Q 1/54; B60Q 2400/20; F21S 48/1159; F21S 4/006; F21S 4/008; F21S 48/1163; F21S 48/217; F21S 48/218
USPC .......................................................... 362/464
See application file for complete search history.

(56) References Cited

U.S. PATENT DOCUMENTS

| 5,163,690 | A  | * | 11/1992 | Davis et al. ..................... 463/15 |
| 5,218,351 | A  | * | 6/1993  | Hashikawa ..................... 345/30 |
| 6,416,209 | B1 | * | 7/2002  | Abbott .......................... 362/506 |
| 6,902,307 | B2 | * | 6/2005  | Strazzanti ..................... 362/541 |
| 7,573,378 | B2 | * | 8/2009  | Matsumoto et al. .......... 340/479 |
| 8,487,836 | B1 | * | 7/2013  | Bodine ............................. 345/6 |
| 8,547,219 | B2 | * | 10/2013 | Kisiel ........................... 340/468 |
| 2004/0108970 | A1 | * | 6/2004 | Nealon .......................... 345/1.2 |
| 2007/0030139 | A1 | * | 2/2007 | Ellison et al. ................. 340/482 |

(Continued)

OTHER PUBLICATIONS

ForvisionFrance, Cube LED for Vision 10 × 10 × 10, http://www.youtube.com/watch?v=IUrD1MaoxTE , uploaded on Nov. 4, 2009.

*Primary Examiner* — Anh Mai
*Assistant Examiner* — Matthew J Peerce
(74) *Attorney, Agent, or Firm* — Quinn Law Group, PLLC

(57) ABSTRACT

A vehicle includes a main lighting control sensor, a body, a housing, an outer lens, and main and expressive lighting assemblies. The sensor generates an output signal in response to a detected vehicle condition such as braking or headlight activation. The lens defines a cavity in conjunction with the housing. The main lighting assembly is positioned within the cavity, and illuminates in response to the output signal. An expressive lighting assembly positioned within the cavity includes clear transparent plates arranged in a stack, with LEDs arranged in multiple rows and columns on a major surface of each plate. Wire arrays connect the LEDs to a control board. The control board receives an activation signal from a device, e.g., a fob, and individually addresses the LEDs to command illumination of the LEDs according to a calibrated LED illumination sequence. A controller may be used for downloading sequences as applications.

20 Claims, 4 Drawing Sheets

(56) References Cited

U.S. PATENT DOCUMENTS

| | | | |
|---|---|---|---|
| 2008/0284578 A1* | 11/2008 | Mouratidis | 340/468 |
| 2009/0052197 A1* | 2/2009 | Peters et al. | 362/487 |
| 2009/0273282 A1* | 11/2009 | Ballard et al. | 315/77 |
| 2011/0146119 A1* | 6/2011 | Wagner | 40/452 |
| 2012/0098652 A1* | 4/2012 | Varella et al. | 340/425.5 |
| 2012/0303458 A1* | 11/2012 | Schuler, Jr. | 705/14.63 |
| 2014/0286034 A1* | 9/2014 | Yamada et al. | 362/518 |

* cited by examiner

EXPRESSIVE VEHICLE LIGHTING ASSEMBLY

TECHNICAL FIELD

The present disclosure pertains to an expressive vehicle lighting assembly.

BACKGROUND

Internal and external vehicle lighting helps to ensure the visibility of the vehicle and its surrounding environment. External vehicle lighting is typically provided via headlights and taillights positioned at the front and rear of the vehicle, respectively. Vehicle lighting assemblies ordinarily reside in housings that are securely affixed to or within the body of the vehicle. The range of possible lighting functions provided by conventional lighting assemblies is typically limited to the intended functions of the lighting assemblies, e.g., as brake lights/turn signals, headlights, running lights, and the like.

SUMMARY

An expressive lighting system is disclosed herein that takes full advantage of any unused or otherwise non-functional space within a cavity of a main lighting assembly, for instance a taillight, headlight, or other adequately sized external or internal vehicle lighting assembly. The expressive lighting assembly is positioned within this available space and controlled in a manner that allows a user and/or manufacturer of the vehicle to display customizable lighting sequences at certain times, without interfering with the normal intended operation of the main lighting assembly. The term "expressive" as used herein thus refers to the displaying of a static and/or dynamic lighting sequence which expresses the unique personality or brand identity of the user or manufacturer, respectively.

By spacing multiple light-emitting diodes (LEDs) in three dimensions within a light housing, i.e., extending through the width, height, and depth of the light housing, any non-functional space within the housing can be fully utilized to enhance a user's driving experience. Each of the LEDs may be individually addressed by a control board, and thus illuminated according to a desired lighting sequence. A vast array of three-dimensional animated/dynamic or static lighting displays can be created and enjoyed in this manner. Example lighting sequences may simulate a waterfall effect or sparking lights/fireworks, or to display a static or dynamic logo or trademark. In an optional embodiment, small downloadable programs or applications ("apps") could be used for additional lighting customization, with any or all of the expressive lighting functionality being automatically overridden by an onboard controller as needed. For example, expressive lighting capabilities may be interrupted or overridden when the vehicle's transmission is shifted into gear and/or when a brake pedal is depressed during normal driving. Other embodiments may activate a particular lighting sequence via a taillight assembly to signal activation of an antilock braking system (ABS). These and other possible configurations may be contemplated within the intended inventive scope.

In particular, a vehicle is disclosed herein that includes a main lighting control sensor, a body, a light housing, an outer lens, a main lighting assembly, and an expressive lighting assembly having a control board. The main lighting control sensor generates an output signal in response to a detected predetermined vehicle condition, e.g., activation of a brake pedal or a headlight switch depending on the function of the main lighting assembly. The light housing is positioned with respect to a surface of the body. The outer lens is connected to the light housing, and defines a cavity in conjunction with the light housing. The main lighting assembly, which is positioned within the cavity in communication with the main lighting control sensor, illuminates in response to the output signal from the main lighting control sensor.

The expressive lighting assembly is also positioned within the cavity, specifically between the outer lens and the main lighting assembly. The expressive lighting assembly includes substantially clear transparent plates arranged in a stack, with each plate having plurality of light-emitting diodes (LEDs) arranged in multiple rows and columns on a major surface of the plate. Wire arrays are electrically connected the LEDs on a respective one of the clear transparent plates. The control board, which is in communication with the LEDS in the stack, receives an activation signal from a device such as a key fob, and individually addresses each of the LEDs in the stack in response to the received activation signal. This includes commanding illumination of the LEDs according to a calibrated LED illumination sequence.

The expressive lighting assembly may include a carrier tray defining a plurality of opposing slots, with each pair of opposing slots receiving and supporting a respective one of the clear transparent plates in parallel with each other. The expressive taillight assembly in a particular embodiment is a taillight assembly. An override sensor may be used to generate an override signal in response to a predetermined vehicle condition, e.g., braking or a transmission gear state, wherein receipt of the override signal temporarily prevents illumination of the LEDs according to the lighting sequence.

An expressive taillight assembly is also disclosed. This assembly includes a taillight housing positioned with respect to a rear surface of the vehicle, a red outer lens connected to the light housing, and a main taillight assembly positioned within the cavity in communication with a brake pedal sensor and a turn signal sensor. The main taillight assembly includes LED brake light strips that illuminate in response to an output signal from the brake pedal sensor and/or from the turn signal sensor. The expressive lighting assembly includes clear transparent plates arranged in parallel with each other in a vertical stack, with at least nine LEDs arranged on the major surface in at least three rows and at least three columns. The control board individually addresses the LEDs in the stack in response to a received activation signal from a key fob to thereby command illumination of the LEDs according to a calibrated LED illumination sequence.

The above features and advantages and other features and advantages of the present invention are readily apparent from the following detailed description of the best modes for carrying out the invention when taken in connection with the accompanying drawings.

DETAILED DESCRIPTION

Figure 1:
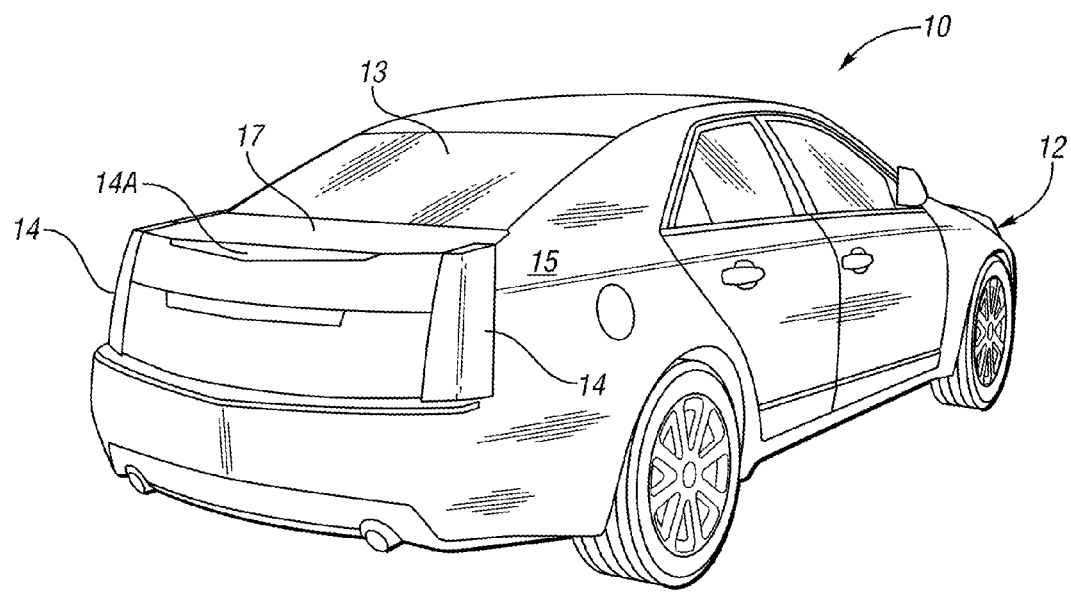
FIG. 1 is a schematic perspective view illustration of an example vehicle having an expressive taillight assembly as described herein.

Referring to the drawings, wherein like reference numbers refer to the same or like components in the several Figures, and beginning with FIG. 1, an example vehicle 10 includes a body 15 and a plurality of internal and external vehicle lighting assemblies each positioned with respect to the body 15. The lighting assemblies include a set of headlight assemblies 12, only one of which is visible from the perspective of FIG. 1, and a set of taillight assemblies 14. One or more additional taillight assemblies 14A may be positioned at the rear of the vehicle 10 for added visibility, for instance above or below a rear window 13 or adjacent to a trunk lid 17, with the latter example shown in FIG. 1. While any of the lighting assemblies of the vehicle 10 may be configured and controlled as set forth herein, whether within or external to the vehicle 10, the taillight assemblies 14 are particularly well suited for use with the present invention, and are thus described hereinafter as an example expressive lighting assembly for illustrative consistency.

The vehicle 10 may include a controller 50 (see FIG. 6) that can be programmed to control "expressive" aspects of the taillight assemblies 14 in order to allow users of the vehicle 10 to express themselves via the taillight assemblies 14. This is done through selectable and/or customizable lighting sequences which are ultimately played out via the taillight assemblies 14. As described below with reference to FIGS. 2-5, the taillight assemblies 14 use a set of clear transparent plates 20 to which are attached multiple individually-addressable light-emitting diodes (LEDs) 22. The lighting sequence(s) are controlled in response to an activation signal, e.g., passive or active detection of a key fob. A method for using the presently disclosed expressive lighting assembly is set forth below with reference to FIG. 7.

Figure 2:
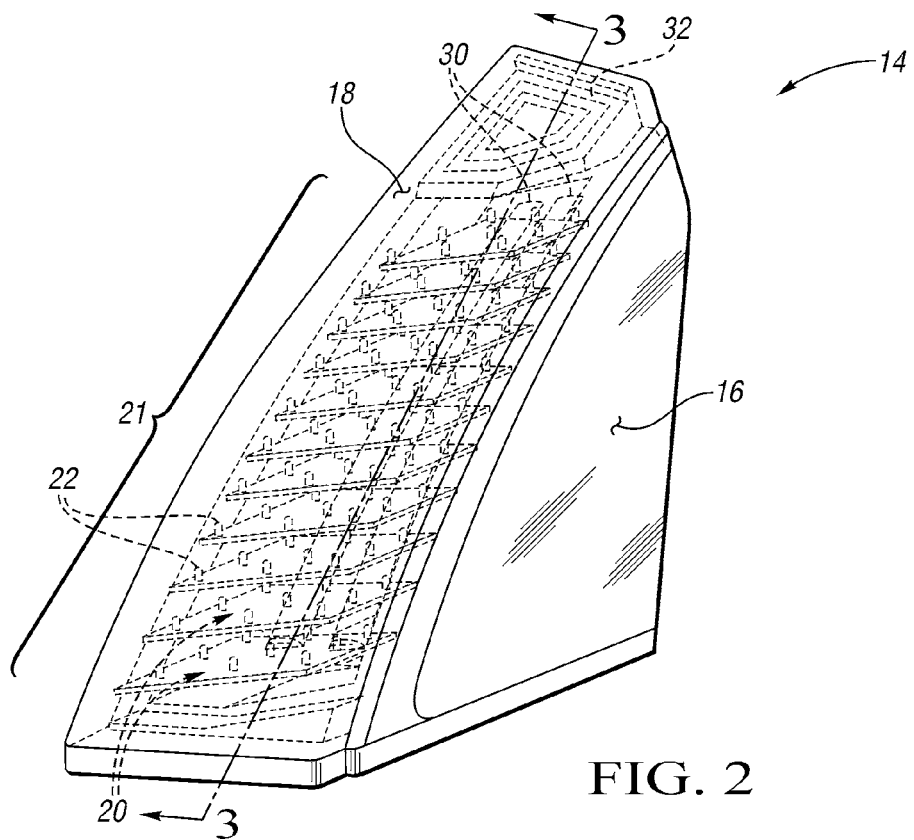
FIG. 2 is a schematic perspective view illustration of an example expressive lighting assembly that is usable with the vehicle shown in FIG. 1.
Figure 3:
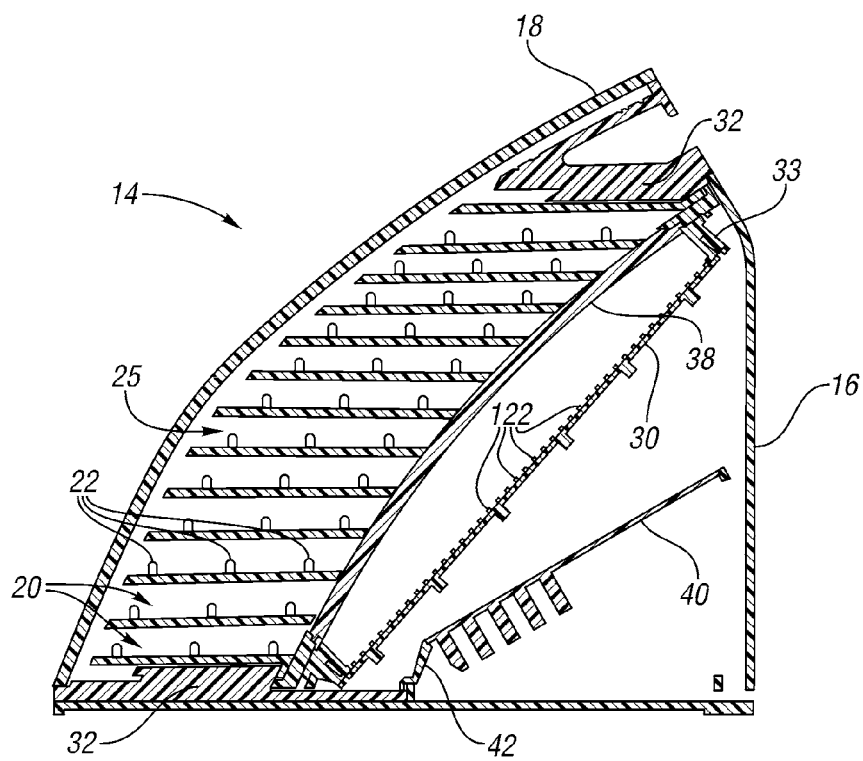
FIG. 3 is a schematic cross-sectional side view of the taillight assembly shown in FIG. 3.

Referring to FIG. 2, each taillight assembly 14 includes a light housing 16 that is constructed of a suitable material such as plastic or metal. An outer lens 18, typically constructed of red transparent or translucent plastic in the example of the taillight assembly 14, or clear/colorless plastic or lightly tinted plastic in other lighting assembly embodiments such as the headlight assemblies 12, is connected to the light housing 16 in the conventional manner. The light housing 16 and the outer lens 18 together define a cavity 25, as best shown in FIG. 3. In a conventional taillight assembly such as that shown in FIGS. 2 and 3, this cavity 25 is largely empty. Therefore, the present design takes full advantage of this available space to package expressive lighting components as described herein to enhance the possible range of lighting effects without increasing required packaging space.

The light housing 16 and the outer lens 18 may encapsulate, i.e., fully surround and enclose, main lighting components such as brake light LED strips 30 (also see FIGS. 3 and 4), or alternatively halogen or other bulbs in other embodiments such as the headlights 12 of FIG. 1. Additionally, the light housing 16 and the outer lens 18 together encapsulate a vertically-oriented stack 21 of the clear transparent plates 20. Each clear transparent plate 20 supports a plurality of individually-addressable LEDs 22.

Any number of clear transparent plates 20 could be used without departing from the intended inventive scope. The shape and size of each clear transparent plate 20 may also vary depending on the particular design of the taillight assembly 14, which may be vertically oriented as shown in FIG. 1, horizontally oriented, or roughly equal in both the vertical and horizontal directions. The clear transparent plates 20 may be parallel to each other within the light housing 16 as best shown in FIGS. 2 and 3.

Figure 6:
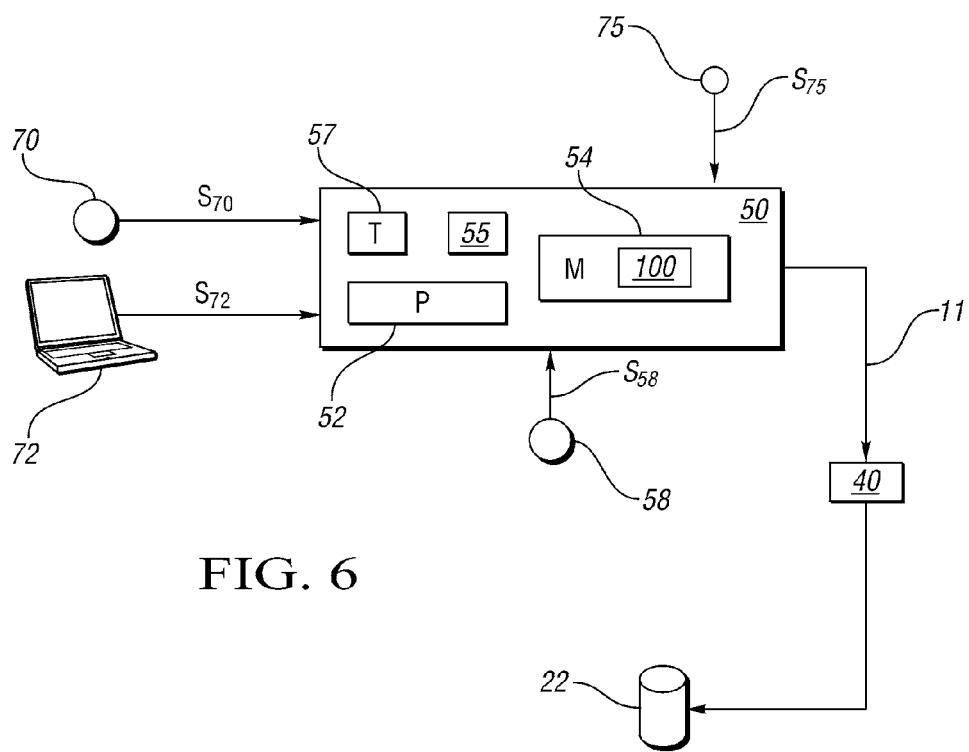
FIG. 6 is a schematic illustration of a controller for the expressive lighting assembly of FIGS. 2-5.

The LEDs 22 on each clear transparent plate 20 are individually-addressable by a control board 40, which is shown in FIG. 3, so as to display a desired dynamic or static lighting sequence, visible through the outer lens 18, in response to an "activation signal" that instructs the control board 40 to execute a programmed lighting sequence via illumination of the LEDs 22. Example trigger events that could lead to the transmission of an activation signal, which is shown in FIG. 6 as arrow $S_{70}$, may include, by way of non-limiting examples, the activation of a key fob or other active detection of a potential occupant of the vehicle 10, entry into/egress from the vehicle 10, depression of a brake pedal when the vehicle 10 is not in gear and/or when the vehicle 10 has not yet been started, and passive proximity sensing of the operator of the vehicle 10, e.g., via RFID. The expressive lighting sequence may be automatically disabled by a separate override signal, i.e., arrow $S_{58}$ of FIG. 6, when the vehicle 10 of FIG. 1 is running or in gear so as to prevent interference with the normal operation of the brake light LED strips 30.

Referring to FIG. 3, the taillight assembly 14 is shown in cutaway side view along a cutting plane 3-3 of FIG. 2, which is the approximate centerline of the taillight assembly 14. FIG. 3 is intended to show the relative arrangement of the different clear transparent plates 20 with respect to the brake light LED strips 30. The clear transparent plates 20 are positioned fully within the cavity 25 between the outer lens 18 and an inner lens 38. All of the internal components of the taillight assembly 14 are received within a bezel 32 constructed of plastic or another suitable material, with structural detail of the bezel 32 also shown in FIG. 4.

The transparent inner lens 38 covers the brake light LED strips 30, the latter of which may also include a plurality of LEDs 122. The transparent inner lens 38 may act as a light diffuser in some embodiments. A shell 33 may be used to secure the brake light LED strips 30 behind the inner lens 38, with any required control components of the brake light LED strips 30 housed on the opposite side of the LEDs 122 as is well known in the art. The control board 40 for the LEDs 22 may be connected to the housing 16 by a control carrier 42 as shown, e.g., between the light housing 16 and the brake light LED strips 30. The brake light LED strips 30 should be oriented such that all of the LEDs 122 are fully visible and can illuminate with the required intensity during braking, driving, and signaling of turns. Again, when the expressive lighting assembly is part of some other lighting assembly such as the headlights 12 of FIG. 1, the arrangement may differ.

Figure 4:
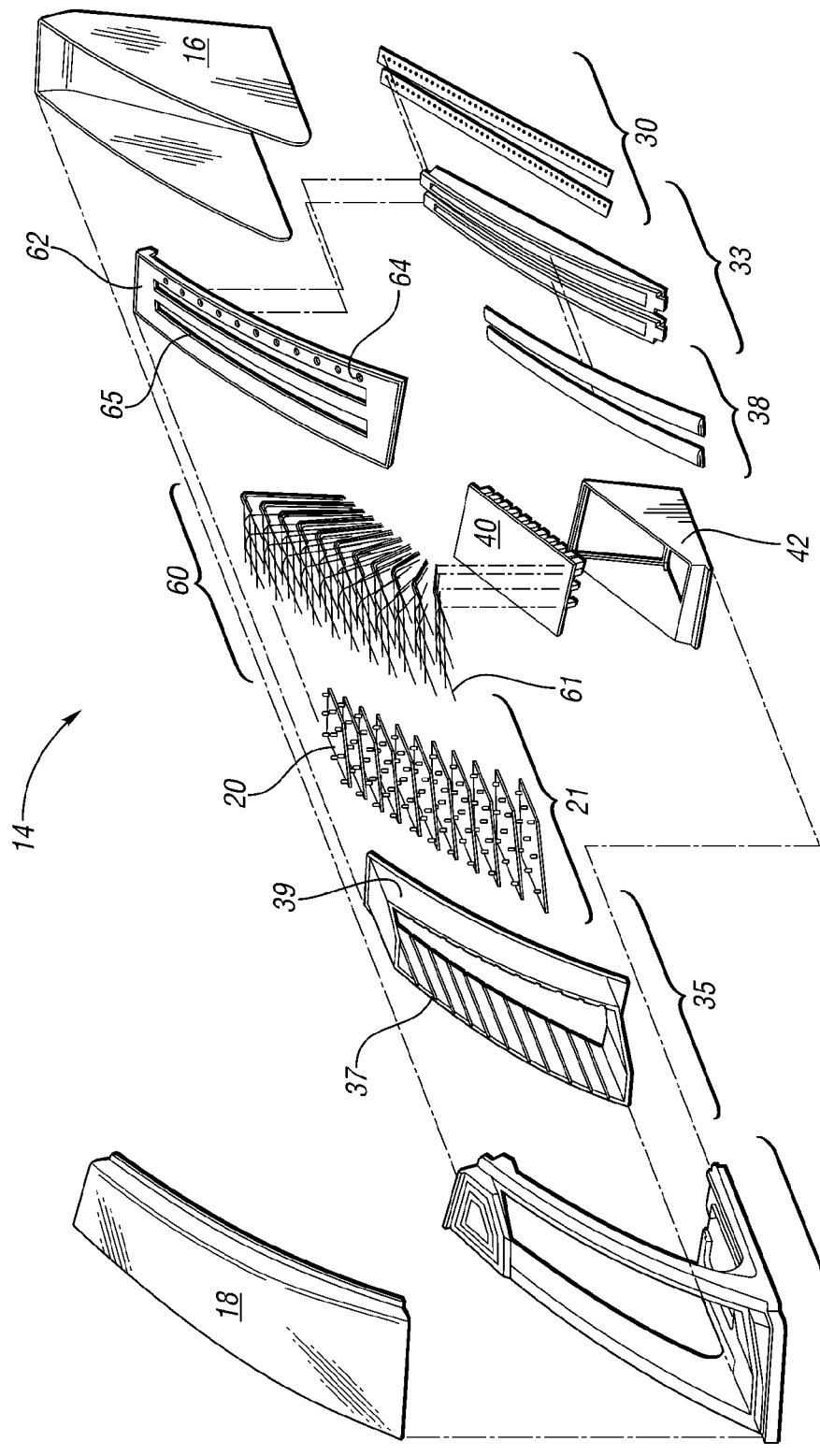
FIG. 4 is a schematic exploded view illustration of the taillight assembly shown in FIGS. 2 and 3.

Referring to FIG. 4, the taillight assembly 14 is shown in exploded view for additional detail. The outer lens 18 and the light housing 16 contain the various components, with the bezel 32 positioned adjacent to the outer lens 18. A carrier tray 35 having side walls 39 is received within the bezel 32. The side walls 39 define a plurality of opposing slots 37. Each of the slots 37 receives and supports an edge of a corresponding one of the clear transparent plates 20, in the manner of a drawer or shelf, to thereby provide the required orientation and spacing of the plates 20 within the LED stack 21. While only one side of the carrier tray 35 is visible from the perspective of FIG. 4, each slot 37 corresponds to an identical slot 37 positioned directly opposite, such that a given transparent plate 20 may be inserted into a corresponding pair of the slots 37.

The control carrier 42 noted above with reference to FIG. 3 may be constructed of molded plastic and received by the bezel 32. In turn, the control carrier 42 receives and houses the control board 40 for the LED stack 21. Each wire 61 of a corresponding wiring array 60, a plurality of which is shown in FIG. 4, is soldered to the control board 40 and routed with respect to the LED stack 21. Each LED 22 in the LED stack 21 is individually-addressable by the control board 40 via transmission of signals over one or more of the wires 61 to command the desired lighting sequence and, ultimately, the intended expressive lighting effect.

The remainder of the taillight assembly 14 contains the conventionally configured and activated brake lights for the vehicle 10 of FIG. 1, e.g., the brake light LED strips 30 in keeping with the taillight example. The LED strips 30 may be contained within a shell 33 and oriented with respect to the outer lens 18 via a trim plate 62. The inner lenses 38 may then cap the shell 33. The trim plate 62 may define a pair of elongated openings 65 through which light emitted from the LED strips 30 is fully visible whenever the brake lights and/or turn signals of the vehicle 10 of FIG. 1 are required. In a particular embodiment, the trim plate 62 may also define a series of holes 64. The various wires 61 of a given one of the wiring arrays 60 may pass through a corresponding one of the holes 64 of the trim plate 62 and extend toward the control board 40, which is located behind the transparent LED strips 30 as best shown in FIG. 3.

Figure 5:
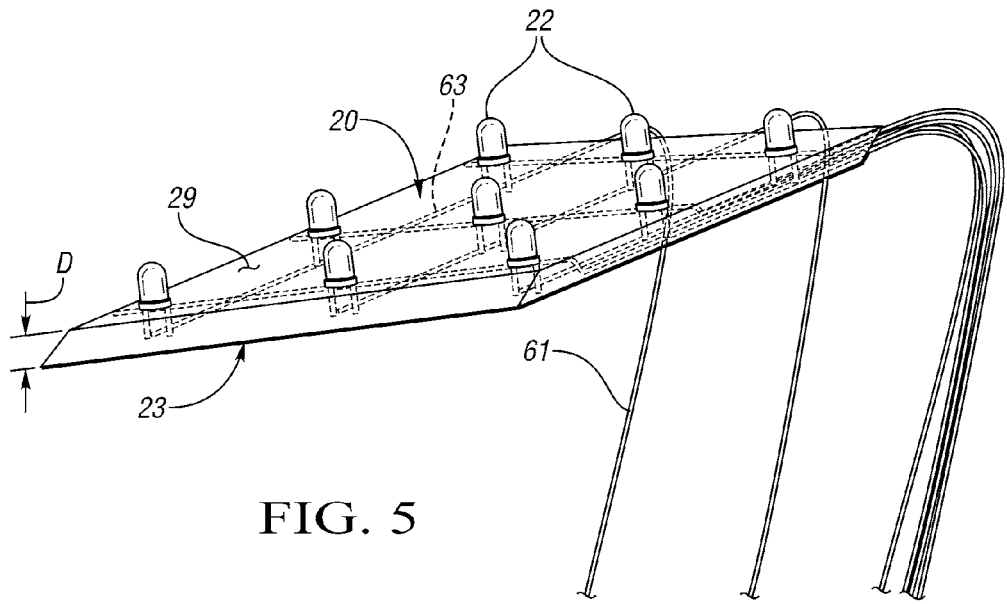
FIG. 5 is a schematic perspective view illustration of a transparent plate that is usable within the expressive taillight assembly of FIGS. 2-4.

Referring to FIG. 5, each transparent plate 20 may be constructed from a polished piece of clear, transparent circuit board material such as glass, plastic, or other sufficiently rigid dielectric substrate. Total transparency of the transparent plates 20 is desirable so as to enhance the quality of the lighting display. Clear, transparent material allows the plates 20 to be seen through for the intended 3D effect. Opaque plates would present only the front column of LEDs 22. However, as absolute clarity and transparency may be difficult to attain in practice, each of the transparent LED plates 20 may be substantially transparent, which as used herein means light scattering of less than 10%, and substantially clear, i.e., devoid of perceptible color to the naked eye of a human observer. Each clear transparent plate 20 may be relatively thin relative to its major dimensions, for example having a thickness dimension (D) between respective major surfaces 29 and 23 of approximately 1 mm per row of LEDs 22, e.g., ±0.2 mm.

The LEDs 22, which in a typical embodiment may be configured with or without a phosphor coating so as to emit white light, may be mounted and arranged in two dimensions on each corresponding transparent plate 20, with the stacking of multiple transparent plates 20 to form the LED stack 21 of FIGS. 2 and 3 providing three-dimensions of lighting to the resultant lighting sequence, i.e., the expressive display to be played out via the taillight assembly 14 of FIGS. 2-4. In the example shown in FIG. 5, nine LEDs 22 are equally spaced about the major surface 29 in three equally-spaced rows of three equally-spaced LEDs 22 per row, a non-limiting example arrangement which provides a tradeoff in the number of LEDs 22 used per transparent plate 20 and the range of possible lighting sequences.

As noted above, each LED 22 is individually-addressable via the control board 40 of FIGS. 3, 4, and 6. This feature allows users the freedom to create a wide variety of unique lighting displays. To this end, the transparent plate 20 may define a plurality of wiring channels 63 through which the individual wires 61 may pass with minimal interference. The wiring channels 63 may be formed in a variety of different ways, including via 3D printing, surface material deposition, laser cutting, and the like. 3D printing in particular may allow the wiring channels 63 to reside entirely internal to the thickness dimension (D) of the transparent plate 20, thus avoiding the need for drilling of the wiring channels 63 into solid plate material after the transparent LED plates 20 are formed. Such an embodiment is also characterized by an absence of bonding to the major surface 29. Laser cutting and surface deposition techniques could be used to form open slots in the major surface 23 opposite the major surface 29, i.e., opposite any surface to which the LEDs 22 are connected or protrude. In these embodiments, the wires 61 would be bonded to the major surface 23 using a suitable insulating material.

Referring to FIG. 6, the controller 50 may be used to further customize and control the lighting sequences enjoyed by a user of the vehicle 10 of FIG. 1. In other embodiments, all control functions may be pre-programmed by the manufacturer or as an aftermarket add-on to reside solely on the control board 40. In an embodiment employing the controller 50, a processor (P) 52, tangible, non-transitory memory (M) 54, and a transceiver (T) 57 may be positioned on a printed circuit board or otherwise sufficiently housed. Instructions embodying a method 100 for using the above-described taillight assembly 14 may be stored in memory 54 and executed via the processor 52 to provide the functionality described herein.

The memory 54 may include read only memory (ROM), optical memory, flash memory, and the like. Transitory memory such as random access memory (RAM) and electrically-erasable programmable read-only memory (EEPROM) may also be included as needed, along with other required circuitry 55 including but not limited to a high-speed clock (not shown), analog-to-digital (A/D) circuitry, digital-to-analog (D/A) circuitry, a digital signal processor, and any necessary input/output (I/O) devices and other signal conditioning and/or buffer circuitry. The controller 50 may be in communication with a device 70, a server 72, a main lighting control sensor 75, and an override sensor 58.

In a possible scenario, a user of the vehicle 10 of FIG. 1 may hold the device 70, for instance a transmitter or RFID key fob. Depression of a button on the device 70, or alternatively passive detection of the device 70 by the controller 50, may result in transmission of an activation signal (arrow $S_{70}$). Receipt of the activation signal (arrow $S_{70}$) by the transceiver 57 can command the processor 52 to play a previously recorded lighting sequence, either for a calibrated duration or until the user starts the vehicle 10 and places it in gear.

The controller 50 may also be configured to receive an application program ("app") (arrow $S_{72}$) from the server 72 or other external source, shown here as a computer device such as a web server, a laptop, or the like. The downloaded app (arrow $S_{72}$) may be a program for a lighting sequence that can be stored in memory 54, much like is presently done for cell phone ring tones or apps used for tablet computers and other mobile devices. Such an approach may be desirable for manufacturers, e.g., as corporate reconfigurable lighting display add-ons which can temporarily illuminate at certain times to differentiate the vehicle 10 from other brands, or to uniquely identify the vehicle 10 to a user. In a crowded or dark parking lot, for example, a user could easily detect the vehicle 10 by virtue of its unique taillight animation, with prominent display of a logo or trademark at vehicle ingress or egress providing a possible marketing benefit to manufacturers.

The main lighting control sensor 75 may be any sensor used in the normal operation of the main lighting assembly being used. For instance, in keeping with the taillight assembly example, the main lighting control sensor 75 may be either or both of a brake pedal force or travel sensor and a turn signal position sensor. When the main lighting assembly includes the headlight assembly 12 of FIG. 1, the main lighting control sensor 75 may be a light switch or a control knob. The main light control sensor 75, however it is configured, transmits an output signal (arrow $S_{75}$) to the controller 50 or directly to the control board 40, with the main lighting assembly illuminating in response to the received output signal (arrow $S_{75}$).

When the customized lighting assembly is positioned within the vehicle 10, other embodiments may display useful information such as an animation or static display of remaining fuel levels, power flow direction in a hybrid design, remaining battery power in an electric vehicle configuration, external weather such as an animation of falling snowflakes or rain, etc. In such an embodiment, the controller 50 could be placed in communication with vehicle sensors (not shown) typically used to detect the displayed state, such that action on the part of the user is not required for activation of these alternative types of displays.

In all of these possible embodiments, the control board 40 remains in communication with each of the LEDs 22. In turn, the controller 50 may transmit a sequence signal (arrow 11) to the control board 40 to initiate playback of the lighting sequence. An override sensor 58 may generate and transmit an override signal (arrow $S_{58}$) when automatic override or disabling of the expressive lighting capabilities described above is required. The override sensor 58 may be, by way of example, an ignition sensor which detects starting of the vehicle 10, a transmission sensor which detects when the transmission of the vehicle 10 is placed in gear, etc. While just one override sensor 58 is shown in FIG. 6 for illustrative simplicity, any number of override sensors 58 may be used for this purpose. Alternatively, any number of override signals (arrow $S_{58}$) may be transmitted via different vehicle control modules, e.g., a transmission or engine control module, without requiring direct communication of the controller 50 with a physical sensor.

Figure 7:
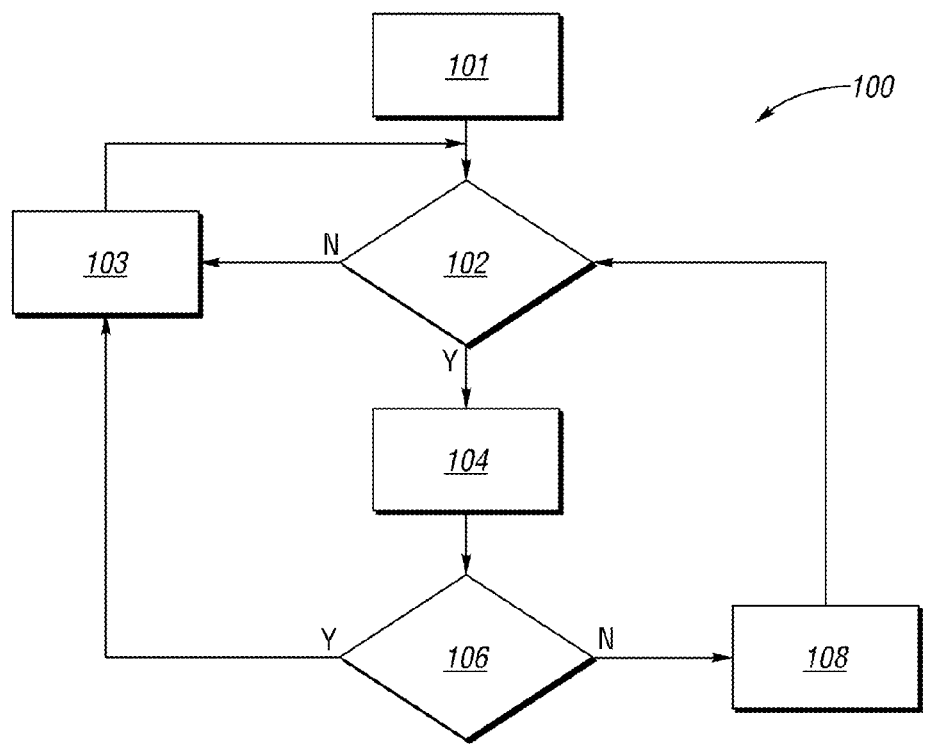
FIG. 7 is a flow chart describing a method for operating the expressive lighting assembly shown in FIGS. 2-6 within the vehicle of FIG. 1.

Referring to FIG. 7, an example method 100 for using an expressive lighting assembly as described above. Once again, for illustrative consistency the taillight assembly 14 of FIGS. 2-5 is treated hereinbelow as the example expressive lighting assembly. Those of ordinary skill in the art will appreciate that the same or a similar approach may be employed in other vehicle lighting assemblies, or indeed in extra-vehicle applications.

Method 100 begins with step 101, wherein a predetermined lighting sequence ($SEQ_X$) is downloaded and recorded, typically in memory 54 of the controller 50 shown in FIG. 6, although the predetermined lighting sequence ($SEQ_X$) may also be stored directly on a memory chip of the control board 40 shown in FIGS. 3 and 4. Step 101 may include downloading existing application programs or "apps" as explained above. As onboard information and entertainment ("infotainment") systems are rapidly evolving which seamlessly coordinate data flow within a vehicle, for instance the Cadillac User Experience (CUE) or the Chevrolet Mylink systems, a typical embodiment may involve wireless communication and data transfer between such a system and a smart phone, tablet, or other mobile device.

In such a configuration, users may synchronize a previously downloaded app from their portable device to the controller 50, which may reside in whole or in part within, or may be in communication with, any onboard infotainment system such as those described above. As the capabilities of such systems evolve, direct download to the onboard system or controller 50 may also be enjoyed. Optionally, a manufacturer or dealership may record one or more lighting sequences prior to sale as an add-on feature. The method 100 proceeds to step 102 once one or more lighting sequences have been recorded.

Step 102 may entail determining whether certain function enabling conditions are satisfied. This step could include making sure the vehicle 10 of FIG. 1 is not running or in gear. Step 102 could include processing the override signal(s) (arrow $S_{58}$) of FIG. 6. The method 100 proceeds to step 103 when the enable conditions are not satisfied, and to step 104 when the enable conditions are satisfied.

At step 103, the controller 50 of FIG. 6 may default to control of the taillight assembly 14 without displaying an expressive lighting sequence. Playing of a sequence recorded at step 102 may be totally disabled whenever the vehicle 10 is in gear in a possible embodiment. Alternatively, step 103 may entail playing some portion of the lighting sequence even if the disabling conditions are present. By way of example, if the vehicle 10 of FIG. 1 is equipped with an anti-lock braking system (ABS), in addition to the normal operation of the brake light LED strips 30 of FIGS. 2-4 the controller 50 may selectively play a special default animation via the taillight assemblies 14 to further alert other drivers that ABS function is active in the vehicle 10. The method 100 then returns to step 102.

Step 104 may include receiving the activation signal (arrow $S_{70}$) of FIG. 6 via the transceiver 57. The method 100 proceeds to step 106 once this has occurred.

At step 106, the controller 50 next determines whether override signal(s) (arrow $S_{58}$) have been received, with the override signals (arrow $S_{58}$) described above with reference to FIG. 6. The method 100 repeats step 103 if the override signals (arrow $S_{58}$) have been received. Otherwise, the method 100 proceeds to step 108.

Step 108 may entail playing one of the recorded sequences ($SEQ_X$) from step 102 via the equipped lighting assembly, such as the taillight assemblies 14 described in the various examples set forth above. Step 108 may include transmitting on/off signals from the control board 40 of FIGS. 3, 4, and 6 to the individual LEDs 22 according to the programmed lighting sequence from step 102. That is, each lighting sequence may be commanded, by way of example, via a binary stream of on/off (1/0) signals transmitted via the wires 61 shown in FIG. 5, with this binary stream commanding a corresponding on/off state for a given LED 22. Collectively, the on/off pattern of all of the LEDs 22 in the LED stack 21 shown in FIGS. 2-4 presents a static image or a dynamic animation. The method 100 then returns to step 102 and proceeds as set forth above.

The various embodiments described above relate to the taillight assembly 14 shown in FIG. 1. While not limited to such embodiments, the taillight assembly 14 in particular typically has a large unused or non-functional internal volume, i.e., the cavity 25 shown generally in FIG. 3. It is recognized herein that this unused volume may be occupied by the LED stack 21 of FIGS. 2-4, which can then be controlled as set forth hereinabove without interfering with normal taillight operation. This in turn allows users of the vehicle 10 of FIG. 1 or any similarly equipped vehicle to express themselves through unique lighting sequence. Other lighting assemblies may be used in lieu of the taillight assemblies 14 to provide a similar benefit, e.g., illuminable displays or badges in the interior or exterior of the vehicle 10 of FIG. 1 or in the headlight assemblies 12. Use of the present displays may also be limited to periods occurring before startup of the vehicle 10, or elements may be used after vehicle start up depending on the location and function of the lighting assembly being customized. In this manner, proper lighting function may be maintained in accordance with existing standards.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a main lighting control sensor which generates an output signal in response to a detected predetermined vehicle condition;
   a body having a surface;
   a light housing positioned with respect to the surface;
   an outer lens that is connected to the light housing, wherein the outer lens and the light housing collectively define a cavity;
   a main lighting assembly positioned within the cavity in communication with the main lighting control sensor, wherein the main lighting assembly is configured to illuminate in response to the output signal from the main lighting control sensor; and
   an expressive lighting assembly positioned within the cavity between the outer lens and the main lighting assembly, and including:
      a plurality of clear transparent plates of circuit board material arranged in a stack, wherein each of the clear transparent plates includes a major surface and a plurality of light-emitting diodes (LEDs) arranged in multiple rows and columns on the major surface of each of the plates, such that all of the major surfaces are in parallel with each other within the stack;
      a plurality of wire arrays each electrically connected the LEDs on a respective one of the clear transparent plates; and
      a control board in communication with the LEDS in the stack, wherein the control board is configured to receive an activation signal from a device, and is programmed to selectively and individually address each of the LEDs in the stack in response to the received activation signal and thereby command illumination of the LEDs according to a calibrated LED illumination sequence.

2. The vehicle of claim 1, wherein the expressive lighting assembly includes a carrier tray defining a plurality of opposing slots, wherein each pair of the opposing slots receives and supports a respective one of the transparent plates and positions the transparent plates in parallel with each of the other transparent plates in the stack.

3. The vehicle of claim 1, further comprising an override sensor that generates an override signal in response to a predetermined vehicle condition, wherein the override signal temporarily prevents illumination of the LEDs in the stack.

4. The vehicle of claim 1, wherein the main lighting assembly includes a plurality of LED strips arranged in a plane that is intersected by a respective plane of each of the clear transparent plates.

5. The vehicle of claim 4, wherein the main lighting control sensor is a brake pedal force or travel sensor and the main lighting assembly is a brake light.

6. The vehicle of claim 1, wherein the main lighting control sensor is a headlight control switch and the main lighting assembly is a headlight assembly.

7. The vehicle of claim 1, wherein each of the plurality of wire arrays is bonded to the major surface of a respective one of the clear transparent plates.

8. The vehicle of claim 1, wherein the wires of each of the plurality of wire arrays is contained within a thickness of a respective one of the clear transparent plates and is characterized by an absence of bonding to the major surface.

9. The vehicle of claim 1, further comprising a controller in communication with the control board and at least one of a server and a portable device, wherein the controller is configured to receive an application from the server or portable device describing the predetermined lighting sequence.

10. A lighting assembly comprising:
    a main lighting control sensor which generates an output signal in response to a detected predetermined condition;
    a light housing positioned with respect to a surface;
    an outer lens that is connected to the light housing, wherein the outer lens defines a cavity in conjunction with the light housing;
    a main lighting assembly positioned within the cavity in communication with the main lighting control sensor, wherein the main lighting assembly is configured to illuminate in response to the output signal from the main lighting control sensor; and
    an expressive lighting assembly positioned within the cavity between the outer lens and the main lighting assembly, including:
       a plurality of clear transparent plates of circuit board material arranged in a stack, wherein each of the clear transparent plates includes a major surface and a plurality of light-emitting diodes (LEDs) arranged in multiple rows and columns on the major surface, wherein the major surfaces are parallel with respect to each other within the stack;
       a plurality of wire arrays each being electrically connected to the LEDs that are arranged on a respective one of the transparent plates; and
       a control board in communication with each of the LEDS in the stack, wherein the control board is configured to receive an activation signal from a device, and is programmed to selectively and individually address each of the LEDs in the stack in response to the received activation signal and thereby command illumination of the LEDs according to a calibrated LED illumination sequence.

11. The lighting assembly of claim 10, wherein the expressive lighting assembly includes a carrier tray defining a plurality of opposing slots, wherein each pair of the opposing slots receives and supports a respective one of the clear transparent plates and positions the clear transparent plates in parallel with each of the other clear transparent plates in the stack.

12. The lighting assembly of claim 10, further comprising an override sensor that selectively generates an override signal in response to a predetermined condition, wherein the override signal temporarily prevents illumination of the LEDs in the stack.

13. The lighting assembly of claim 10, wherein the main lighting assembly includes a plurality of LED strips arranged in a plane that is intersected by a respective plane of each of the transparent plates.

14. The lighting assembly of claim 13, wherein the main lighting control sensor is a brake pedal force or travel sensor of a vehicle, the surface is of a body of the vehicle, and the main lighting assembly is a brake light.

15. The lighting assembly of claim 10, wherein the main lighting control sensor is a headlight control switch of a vehicle, the surface is of a body of the vehicle, and the main lighting assembly is a headlight assembly.

16. The lighting assembly of claim 10, further comprising a controller in communication with the control board and at least one of a server and a portable device, wherein the controller is configured to receive an application from the server or portable device describing the predetermined lighting sequence.

17. A lighting assembly for a vehicle, comprising:
a taillight housing positioned with respect to a rear surface of the vehicle;
a red outer lens that is connected to the light housing, wherein the red outer lens defines a cavity in conjunction with the light housing;
a taillight assembly positioned within the cavity in communication with a brake pedal sensor and a turn signal sensor, wherein the taillight assembly is configured to illuminate a plurality of light-emitting diode (LED) brake light strips in response to an output signal from the brake pedal sensor and/or from the turn signal sensor; and
an expressive lighting assembly positioned within the cavity between the red outer lens and the taillight assembly, and including:
a plurality of clear transparent plates of circuit board material arranged in parallel with each other in a vertical stack, wherein each of the clear transparent plates includes a major surface, and wherein the major surfaces are parallel with respect to each other within the vertical stack, and further includes at least nine LEDs arranged on each major surface of each clear transparent plate in at least three rows and at least three columns;
a plurality of wire arrays equal to the number of the clear transparent plates, with each of the wire arrays being electrically connected to the LEDs arranged on a respective one of the clear transparent plates; and
a control board in communication with each of the LEDS in the stack, wherein the control board is configured to receive an activation signal from a key fob, and is programmed to selectively and individually address each of the LEDs in the stack in response to the received activation signal thereby command illumination of the LEDs according to a calibrated LED illumination sequence.

18. The lighting assembly of claim 17, wherein the expressive lighting assembly further includes a carrier tray defining a plurality of opposing slots, wherein each pair of the opposing slots receives and supports a respective one of the clear transparent plates and positions the clear transparent plates in parallel with each other.

19. The lighting assembly of claim 17, wherein the vehicle includes a controller in communication with the control board and at least one of a server and a portable device, and wherein the control board is configured to receive an application from the server or portable device via the controller, with the application defining the predetermined lighting sequence.

20. The lighting assembly of claim 17, further comprising an override sensor that generates an override signal in response to a predetermined vehicle condition, wherein the override signal temporarily prevents illumination of the LEDs in the stack.

* * * * *